United States Patent
Kobayashi et al.

(10) Patent No.: US 6,532,662 B2
(45) Date of Patent: Mar. 18, 2003

(54) METHOD FOR PROCESSING DYNAMIC PRESSURE GROOVE OF FLUID DYNAMIC BEARING

(75) Inventors: Yasuhiro Kobayashi, Kashihara (JP); Yoshiki Fujii, Kashiba (JP); Takeshi Takahashi, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/803,672

(22) Filed: Mar. 12, 2001

(65) Prior Publication Data

US 2001/0027924 A1 Oct. 11, 2001

(30) Foreign Application Priority Data

Mar. 13, 2000 (JP) .......................................... 2000-068494

(51) Int. Cl.⁷ ................................................. B21K 1/10
(52) U.S. Cl. ....................... 29/898.02; 216/94; 205/648; 205/649; 205/651; 205/654; 205/686
(58) Field of Search ....................... 29/898.02, DIG. 16; 216/94; 384/123; 72/54, 55; 205/648, 649, 651, 652, 653, 654, 686

(56) References Cited

U.S. PATENT DOCUMENTS

| | | | |
|---|---|---|---|
| 5,628,568 A | * | 5/1997 | Takahashi et al. |
| 6,200,035 B1 | * | 3/2001 | Otsuki |
| 2001/0050235 A1 | * | 12/2001 | MacLeod et al. |
| 2002/0126923 A1 | * | 9/2002 | Usui |

FOREIGN PATENT DOCUMENTS

| | | | |
|---|---|---|---|
| DE | 24 37 047 | * | 2/1976 |
| GB | 2319741 | * | 6/1998 |
| JP | 56-056342 | * | 5/1981 |
| JP | 04-053627 | * | 2/1992 |
| JP | 10-086020 | * | 4/1998 |
| JP | 10-180545 | * | 7/1998 |
| JP | 10-217035 | * | 8/1998 |
| JP | 10-220460 | * | 8/1998 |

* cited by examiner

Primary Examiner—Gregory M. Vidovich
Assistant Examiner—Eric Compton
(74) Attorney, Agent, or Firm—Nixon & Vanderhye P.C.

(57) ABSTRACT

According to this dynamic pressure groove processing method, dynamic pressure grooves are formed in specified regions by electrochemical machining with the electrode of an electrode tool put close to a workpiece in the initial stage. Through this electrochemical machining, corners of land portions adjacent to the dynamic pressure grooves can be curved and smoothed. Next, by subjecting the workpiece to electrochemical machining with the electrode of the electrode tool put away from the workpiece, the land portions are to undergo weak electrochemical machining. Surface roughness of surfaces of the land portions can be reduced, and the curved corners of the land portions can be made smoother at the same time. Therefore, the abrasion resistance characteristic of the dynamic pressure grooves can be improved further than that achieved by the conventional electrochemical machining, allowing the abrasion resistance characteristic and reliability to be sufficiently improved.

2 Claims, 2 Drawing Sheets

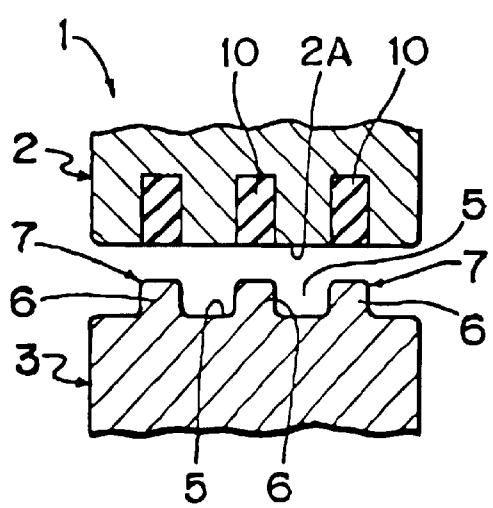
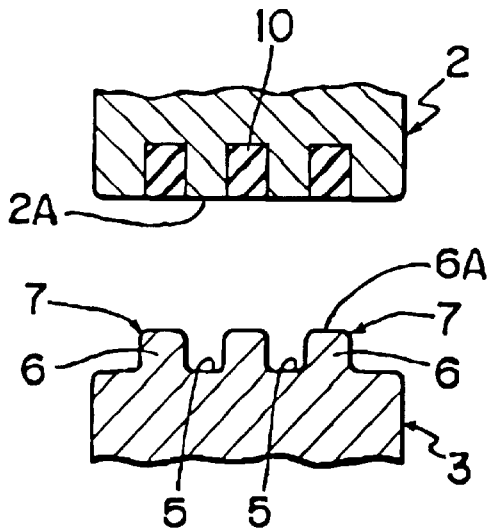
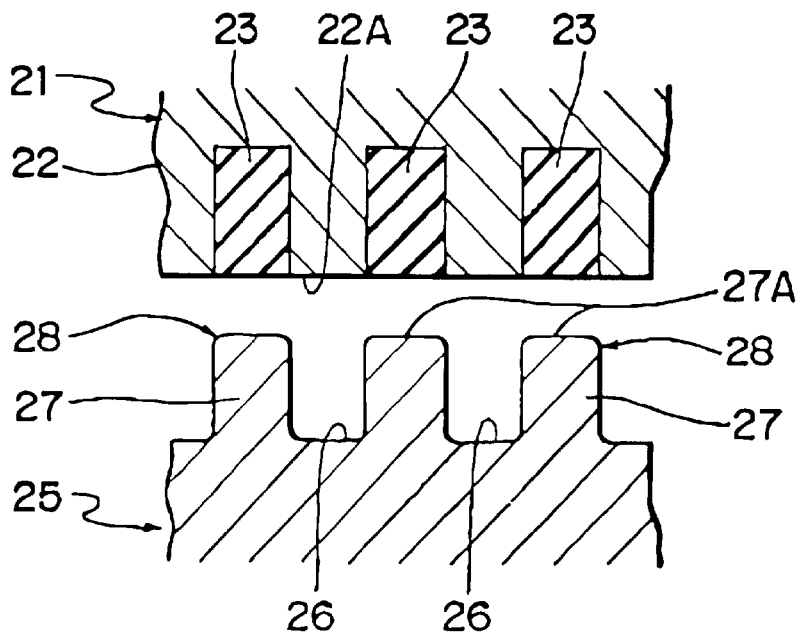

METHOD FOR PROCESSING DYNAMIC PRESSURE GROOVE OF FLUID DYNAMIC BEARING

BACKGROUND OF THE INVENTION

The present invention relates to a dynamic pressure groove processing method for forming the dynamic pressure groove of a fluid dynamic bearing by electrochemical machining.

In regard to a fluid dynamic bearing having a dynamic pressure groove 101 formed by machining as shown in FIG. 3B, if sharp edges 103 and 103 of land portions 102 and 102 located between the dynamic pressure grooves 101 and 101 are brought in contact with the opposite bearing surface (not shown) in an inoperative state, then the bearing surface is damaged, reducing the durability of the bearing. If a surface 102A of the land portion 102 has a significant surface roughness, then the surface 102A of the land portion 102 that has the significant surface roughness comes in contact with the bearing surface in the inoperative state, consequently abrading the bearing surface and reducing the durability of the bearing.

In view of the above, if the dynamic pressure groove is formed by electrochemical machining, as shown in FIG. 3A, then the corners of land portions 82 located between dynamic pressure grooves 81 come to have a curved surface 83, eliminating edges. At the same time, surfaces 82A of the land portions 82 are allowed to have a relatively small surface roughness. Although the abrasion resistance characteristic can be improved with this arrangement, the effects have not been sufficient.

SUMMARY OF THE INVENTION

Accordingly, the present invention has the object of providing a dynamic pressure groove processing method capable of improving the abrasion resistance characteristic of the dynamic pressure groove further than that achieved by the conventional electrochemical machining and sufficiently improving the abrasion resistance characteristic and reliability.

In order to achieve the above object, there is provided a dynamic pressure groove processing method comprising the steps of:

setting an electrode tool having an electrode opposite to a workpiece with interposition of a specified gap and forming a dynamic pressure groove on the workpiece by electrochemical machining; and setting the electrode tool opposite to the workpiece with interposition of a gap larger than the above gap and electrochemically processing a surface of the workpiece.

According to the present invention, first of all, dynamic pressure grooves are formed in specified regions by electrochemical machining with the electrode of an electrode tool put close to a workpiece in the initial stage. According to this electrochemical machining, corners of land portions adjacent to the dynamic pressure groove can be curved and smoothed.

Next, by subjecting the workpiece to electrochemical machining with the electrode of the electrode tool put away from the workpiece, the land portions are to undergo weak electrochemical machining. By this operation, the surface roughness of the surfaces of the land portions can be reduced, and the curved corners of the land portions can be made smoother at the same time.

Therefore, according to the present invention, the surface roughness of the land portions located between the dynamic pressure grooves can be reduced and smoothed further than in the conventional case, allowing the corners of the land portions to be curved more smoothly. Therefore, the abrasion resistance characteristic of the dynamic pressure groove can be improved further than that achieved by the conventional electrochemical machining, allowing the abrasion resistance characteristic and reliability to be sufficiently improved.

Also, there is provided a dynamic pressure groove processing method for setting an electrode tool having an electrode opposite to a workpiece with interposition of a specified gap and forming a dynamic pressure groove on the workpiece by electrochemical machining, whereby a surface that belongs to the workpiece and is located within a region opposite to an insulator is electrochemically processed more weakly than a surface that belongs to the workpiece and is located within a region opposite to the electrode by flowing a current through the insulator buried in the electrode, the current being smaller than a current to be flowed through the electrode.

According to the present invention, the workpiece located in the region opposite to the electrode of the electrode tool undergoes strong electrochemical machining to have a dynamic pressure groove formed. At the same time, regions that belong to the workpiece and are located in the regions opposite to insulators (corresponding to the land portions) adjacent to the electrode undergo weak electrochemical machining, by which land portions that have a smooth surface and a smoothly curved corner are formed. Therefore, according to the present invention, the surface roughness of the land portions located between the dynamic pressure grooves can be reduced and smoothed further than in the conventional case, allowing the corners of the land portions to be curved more smoothly.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A is a schematic sectional view for explaining the first process according to the first embodiment of the present invention;

FIG. 1B is a schematic sectional view for explaining the next process of the first embodiment;

FIG. 2 is a schematic sectional view for explaining the second embodiment of the present invention;

DETAILED DESCRIPTION OF THE PREFERRED EMBODIMENTS

Figure 3A:
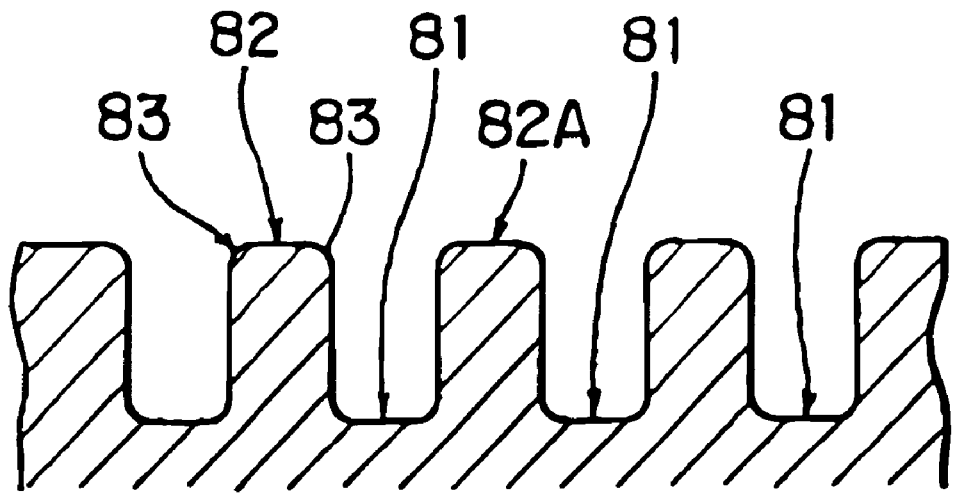
FIG. 3A is a schematic sectional view of a typical dynamic pressure groove formed by a recessing process based on electrochemical machining.
Figure 3B:
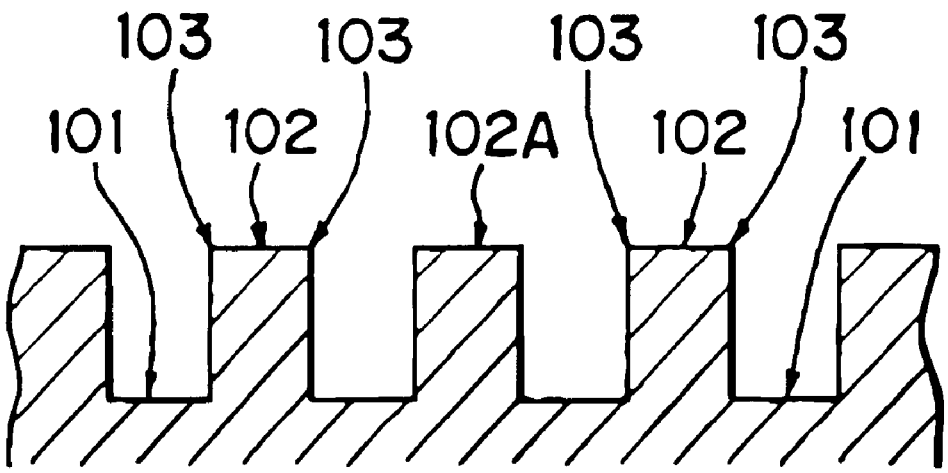
FIG. 3B is a schematic sectional view of a typical dynamic pressure groove formed by a recessing process based on mechanical machining.

The present invention will be described in detail below on the basis of the embodiments thereof shown in the drawings.

(First Embodiment)

The dynamic pressure groove processing method according to the first embodiment of the present invention will be described with reference to FIGS. 1A and 1B. In this embodiment, first of all, as shown in FIG. 1A, dynamic pressure grooves 5 are formed in specified regions by electrochemical machining with the electrode 2 of an electrode tool 1 put close to a workpiece 3 in the initial stage. According to this electrochemical machining, corners 7 of land portions 6 adjacent to the dynamic pressure grooves 5 can be curved and smoothed. As for the processing conditions of this electrochemical machining, the dynamic pressure grooves 5 are formed to a groove depth of about 10 μm by applying three times to the electrode 2, for example, a pulse of a current density of 10 A/cm² for 0.1 second.

In this first embodiment, the electrode tool 1 is provided with insulators 10 buried in a surface 2A of the electrode 2, and the insulators 10 are made to oppose to the land portions 6.

Next, the electrode 2 of the electrode tool 1 is put away from the workpiece 3, and the workpiece 3 is subjected to the electrochemical machining. By this operation, the land portion 6 undergoes weak electrochemical machining, as a consequence of which the surface roughness of surfaces 6A of the land portions 6 can be reduced and the curved corners 7 of the land portions 6 can be made smoother.

Therefore, according to this first embodiment, the surface roughness of the land portions 6 located between the dynamic pressure grooves 5 can be reduced and smoothed further than in the conventional case, allowing the corners 7 of the land portions 6 to be curved more smoothly. Therefore, the abrasion resistance characteristic of the dynamic pressure grooves can be improved further than achieved by the conventional electrochemical machining, and the abrasion resistance characteristic and reliability can be sufficiently improved.

(Second Embodiment)

The dynamic pressure groove processing method according to the second embodiment of the present invention will be described with reference to FIG. 2. In this embodiment, insulators 23, 23 and 23 are buried at regular intervals on a surface 22A of the electrode 22 of an electrode tool 21. The insulators 23 are made of a material that has an electric conductivity of such a degree that, if a current is flowed through the electrode 22, then an electric current weaker than this current flows.

Then, as shown in FIG. 2, the electrode 22 of the electrode tool 21 is made to oppose to a workpiece 25 with interposition of a specified gap, and a current is flowed through the electrode 22 to subject the workpiece 25 to electrochemical machining. By this operation, a region opposite to the electrode 22 is electrochemically strongly processed to form dynamic pressure grooves 26, while regions opposite to the insulators 23 are electrochemically weakly processed to form land portions 27 whose surfaces 27A are smooth and whose corners 28 are smoothly curved.

Therefore, according to this second embodiment, the surface roughness of the land portions 27 located between the dynamic pressure grooves 26 can be reduced and smoothed further than in the conventional case, allowing the corners 28 of the land portions 27 to be curved more smoothly. Therefore, the abrasion resistance characteristic of the dynamic pressure grooves can be improved further than that achieved by the conventional electrochemical machining, and the abrasion resistance characteristic and reliability can be sufficiently improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic pressure groove processing method comprising the steps of:

setting an electrode tool having an electrode opposite to a workpiece with interposition of a specified gap;

forming a dynamic pressure groove in a surface of the workpiece by electrochemical machining;

moving the electrode tool relative to the workpiece to a gap larger than said specified gap; and electrochemically processing said surface of the workpiece.

2. A dynamic pressure groove processing method comprising the steps of:

setting an electrode tool opposite to a workpiece with interposition of a specified gap and forming a dynamic pressure groove in a surface of the workpiece by electrochemical machining, said tool having at least one electrode and at least one partially conductive insulator, wherein said surface opposite to said at least one insulator is electrochemically processed more weakly than said surface opposite to the electrode, by flowing a smaller current through the insulator than a current flowed through the electrode.

* * * * *